United States Patent Office 2,837,487
Patented June 3, 1958

2,837,487
RESISTOR ENAMEL AND RESISTOR MADE THEREFROM

Daniel Edward Huttar, Staten Island, N. Y., assignor to E. I. du Pont de Nemours and Company, Wilmington, Del., a corporation of Delaware Application January 25, 1956, Serial No. 561,969

5 Claims. (Cl. 252—514)

This invention relates to a resistor enamel which may be applied to and fired on a ceramic dielectric material to produce an electric resistor, and resistors produced from such enamel.

Many attempts have been made heretofore to produce electrical resistors by printing an enamel containing an electrically conductive material on a ceramic insulator and firing the same to fuse and mature the enamel composition. Such previously produced resistors, although operative, were not easily reproducible to a given resistance value.

It is an object of this invention to produce a vitreous enamel containing electrically conductive material which can be made into a paste that can be printed, squeegeed, or otherwise applied to a ceramic insulating material and fired to produce resistance elements having a substantially uniform resistance.

It is another object of this invention to produce a vitreous enamel paste containing electrically conductive material which is suitable to be squeegeed on a ceramic insulator and fired thereon to form readily reproducible resistors.

It is yet another object of this invention to produce improved electrical resistors comprising a ceramic insulating base and a fired-on vitreous enamel having an electrical conductance of a substantially uniform resistance value.

Other objects of the invention will appear hereinafter.

The vitreous enamel-containing conductive material of this invention may be prepared by mixing, with a vitreous enamel flux, finely divided silver and finely divided cuprous oxide, and optionally cupric oxide, in the following proportions, by weight, 10% to 25% powdered vitreous enamel flux,
3% to 26% finely divided silver,
0% to 25% finely divided cupric oxide, and
87% to 29% cuprous oxide.

The electrical resistance of the fired resistor can be controlled and stabilized if a quantity of cupric oxide also be added to the vitreous enamel-conductive material composition.

The vitreous flux is preferably composed of a metal borosilicate, for example, lead borosilicate, cadmium borosilicate, or cadmium-zinc borosilicate, but outstanding results from a standpoint of stability and reproducibility are obtained by the use of an alkaline earth metal borosilicate, i. e., barium, calcium or strontium borosilicate, particularly barium borosilicate.

The preferred alkaline earth metal borosilicate may be produced by mixing

40% to 60% alkaline earth metal carbonate,
20% to 40% boric acid, and
10% to 40% silicon dioxide, melting the same at an elevated temperature, pouring the melt into water at room temperature, and milling the coarse frit for about five to twenty hours in the ordinary ball mill with water. The vitreous flux may contain minor amounts of other oxides without materially affecting the operability thereof. For example, the flux may contain up to a total of 25% of the weight of the flux of zinc oxide, cadmium oxide, lead oxide, or magnesium oxide.

The finely divided silver may be chemically precipitated silver or finely divided flake silver having a size such that 80% will pass through a screen of 100 meshes per linear inch. The cuprous and cupric oxides may be ordinary commercial grades of powdered oxide.

The vitreous flux, the silver powder and cuprous oxide, with or without cupric oxide, may be mixed together in a ball mill and packaged and sold as such for use with a liquid vehicle. If desired, these powdered constituents may be mixed together in the presence of a sufficient quantity of a liquid vehicle to form a soft paste mixture which may be squeegeed through a screen stencil. The vehicle may vary widely in composition. Any inert liquid may be employed for this purpose, for example, water, organic solvents with or without thickening agents, stabilizing agents, or the like, for example, methyl, ethyl, butyl, propyl or higher alcohols, the corresponding esters such as the acetates, propionates, etc., the terpenes and liquid resins, for example, pine oil, alpha-terpineol, and the like, and other liquids without limitation, the function of the liquid vehicle being mainly to form a liquid or paste of the desired consistency for application purposes. The vehicles may contain or be composed of volatile liquids to promote fast setting after application, or they may contain waxes, thermoplastic resins, or wax-like materials which are thermofluid by nature whereby the composition may be applied to a ceramic insulator while at an elevated temperature to set immediately upon contact with the ceramic base.

The ceramic insulating material may be comprised of any ceramic material that can withstand the firing temperature of the vitreous enamel-conductive material composition. For example, glass, porcelain, refractory, barium titanate, metal carbides, or the like, may be used. Preferably, the ceramic insulating materials should have a smooth, substantially uniform surface structure but this is not absolutely necessary.

As above stated, the vitreous enamel-conductive material composition may be applied to the ceramic insulator in any desired manner such as by painting, printing, squeegeeing, spraying, or the like.

The ceramic insulator to which the vitreous conductive material is applied is then subjected to drying, if necessary, and firing whereby to solidly bind the conductive material to the ceramic base. This may be done in the conventional manner of firing enamels or glazes in a lehr or furnace. In the event that the vehicle employed contains a volatile solvent, it is desired to dry the applied vitreous enamel-conductive material paste for a period of five to twenty minutes at a temperature of 200° to 400° F. to remove the solvent. If the vehicle is a thermofluid substance, no drying is generally necessary. The temperature of the firing operation will depend mainly upon the composition of the borosilicate flux employed.

The following examples are given to illustrate certain details of the invention, it being understood that the details of the examples are not to be taken as in any way limiting the invention thereto.

Example 1

A barium silicate flux is prepared from a raw bath containing

55% barium carbonate,
30% boric acid, and
15% silicon dioxide.

The raw materials are melted at 1300° C. and poured in the molten state into water at room temperature. The resulting coarse fritted material is then milled in a ball mill with water for a period of sixteen hours.

The milled barium borosilicate flux is then mixed with an equal amount, by weight, of precipitated silver powder and one and one-half times the weight of the flux of each of cupric oxide and cuprous oxide. The mixed composition contains, by weight, 20% barium borosilicate,
20% precipitated silver powder,
30% cuprous oxide, and
30% cupric oxide.

The so mixed powders are then mixed with a vehicle composed of 94.5% alpha-terpineol,
5.0% low viscosity ethyl cellulose, and
0.5% lecithin in the ratio of 20 parts vehicle to 100 parts mixed powders.

The resulting paste is applied to a barium titanate wafer by squeegeeing through a screen stencil, dried, and fired to a temperature of 1400° F. The conductive material is strongly bonded to the barium titanate and the resistor as produced has a resistance of 0.65 megohms per square inch of printed patterns over a range of 0 to 130 volts D. C.

*Example II*

In the process of Example I either calcium or strontium borosilicate flux may be used. For example, a flux made from 50% calcium carbonate,
35% boric acid, and
15% silicon dioxide, or one made from 55% strontium carbonate,
35% boric acid, and
10% silicon dioxide, or mixtures such as 45% barium carbonate,
10% calcium carbonate,
30% boric acid, and
15% silicon dioxide may be used with substantially no change in firing, electrical resistance, or adhesion properties.

*Example III*

The mixed powder of Example I may be mixed with a vehicle for screen stencil application consisting of 23.1% hexylene glycol,
69.4% carbitol acetate, and
7.5% ethyl cellulose.

Somewhat less reproducibility in application thickness and in the resulting resistance value was observed. However, the resistors as produced rated highly as practical electrical units for most purposes.

*Example IV*

Ten resistance elements one-eighth inch square were printed on barium titanate discs using the composition of Example I. These were fired in a continuous belt furnace to a peak temperature of 1400° F. The total firing cycle was twenty minutes but the peak temperature was held for only three minutes. Resistance measurements showed a variation of ±15% from 0.65 megohms per square inch which is within the range of many tubular carbon resistors.

*Example V*

A composition prepared as in Example I, but using no cupric oxide, thus,

20% barium borosilicate,
25% precipitated silver, and
55% cuprous oxide, when mixed with the alpha-terpineol, ethyl cellulose, lecithin vehicle specified in Example I, in the ratio of 20 parts of vehicle to 100 parts of mixed powders, and printed and fired as in Example IV showed resistance values of 0.33 megohms per square pattern over a range of 0 to 120 volts D. C.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A vitreous flux adapted to be applied to and fired on a ceramic insulating material to produce an electric resistor of substantially uniform resistance value comprising 10% to 25% powdered vitreous metal borosilicate, 3% to 26% finely divided silver, 0% to 25% finely divided cupric oxide, and 29% to 87% cuprous oxide.

2. A vitreous flux as defined by claim 1 in which the powdered vitreous material is an alkaline earth metal borosilicate.

3. A vitreous flux as defined by claim 1 in which the powdered vitreous material is barium borosilicate.

4. A vitreous flux paste adapted to be applied to and fired on a ceramic insulating material to produce an electric resistor of substantially uniform resistance value comprising a vitreous flux comprising 10% to 25% powdered vitreous metal borosilicate, 3% to 26% finely divided silver, 0% to 25% finely divided cupric oxide, and 29% to 87% cuprous oxide, together with sufficient liquid vehicle to form a paste with said flux components.

5. An electric resistor of substantially uniform resistance value comprising a ceramic insulator and a fired-on conductive layer comprising 10% to 25% of a vitreous metal borosilicate, 3% to 26% finely divided silver, and 29% to 87% finely divided cuprous oxide.

References Cited in the file of this patent

UNITED STATES PATENTS

| | | |
|---|---|---|
| 2,569,773 | Orr | Oct. 2, 1951 |
| 2,614,944 | Lytle | Oct. 21, 1952 |
| 2,694,016 | Craven | Nov. 9, 1954 |

OTHER REFERENCES

J. W. Mellor, "Treatise on Inorganic and Theoretical Chemistry," Longman, Green and Co., London (1923), vol. 3, pages 124–134.